(12) United States Patent
Ikejiri et al.

(10) Patent No.: US 10,020,508 B2
(45) Date of Patent: Jul. 10, 2018

(54) COMPOSITE MATERIAL AS ELECTRODE FOR SODIUM ION BATTERIES, PRODUCTION METHOD THEREFOR, AND ALL-SOLID-STATE SODIUM BATTERY

(71) Applicant: Nippon Electric Glass Co., Ltd., Shiga (JP)

(72) Inventors: Junichi Ikejiri, Shiga (JP); Hideo Yamauchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 64 days.

(21) Appl. No.: 15/039,913

(22) PCT Filed: Dec. 1, 2014

(86) PCT No.: PCT/JP2014/081773
§ 371 (c)(1),
(2) Date: May 27, 2016

(87) PCT Pub. No.: WO2015/087734
PCT Pub. Date: Jun. 18, 2015

(65) Prior Publication Data
US 2017/0005337 A1    Jan. 5, 2017

(30) Foreign Application Priority Data

Dec. 9, 2013    (JP) .................................. 2013-253878
Aug. 20, 2014   (JP) .................................. 2014-167071
Nov. 26, 2014   (JP) .................................. 2014-238509

(51) Int. Cl.
| | | |
|---|---|---|
| H01B 1/08 | (2006.01) | |
| H01M 4/58 | (2010.01) | |
| H01M 10/054 | (2010.01) | |
| H01M 10/0562 | (2010.01) | |
| H01M 4/136 | (2010.01) | |
| H01M 4/04 | (2006.01) | |
| H01M 4/36 | (2006.01) | |
| H01M 4/62 | (2006.01) | |

(52) U.S. Cl.
CPC ............ *H01M 4/5825* (2013.01); *H01B 1/08* (2013.01); *H01M 4/0471* (2013.01); *H01M 4/136* (2013.01); *H01M 4/364* (2013.01); *H01M 4/62* (2013.01); *H01M 10/054* (2013.01); *H01M 10/0562* (2013.01); *H01M 2300/0071* (2013.01)

(58) Field of Classification Search
CPC .. H01B 1/08; H01M 10/054; H01M 10/0562; H01M 4/136; H01M 4/5825; H01M 4/0471; H01M 4/364; H01M 4/62; H01M 2300/0071

USPC ............. 252/519.1, 518.1; 429/231.9, 218.1; 204/280
See application file for complete search history.

(56) References Cited

U.S. PATENT DOCUMENTS

| | | | | |
|---|---|---|---|---|
| 4,097,345 A | * | 6/1978 | Shannon .................. | C04B 35/01 204/242 |
| 4,586,991 A | * | 5/1986 | Nicholson ............... | C04B 35/16 204/421 |
| 4,657,879 A | * | 4/1987 | Nicholson ............... | C01B 33/20 423/263 |
| 5,130,038 A | * | 7/1992 | Bloink ................. | C10M 171/001 252/572 |
| 5,580,430 A | * | 12/1996 | Balagopal ............ | B01J 19/2475 204/252 |
| 9,537,146 B2 | * | 1/2017 | Nose ........................ | C01B 25/45 |
| 9,627,697 B2 | * | 4/2017 | Hori ...................... | H01M 8/1246 |
| 2006/0194113 A1 | * | 8/2006 | Okada ...................... | C01B 25/45 429/231.9 |
| 2009/0134842 A1 | * | 5/2009 | Joshi .................... | H01M 2/1646 320/127 |
| 2009/0189567 A1 | * | 7/2009 | Joshi .................... | C04B 35/447 320/127 |
| 2011/0117415 A1 | * | 5/2011 | Saka ...................... | C01B 25/45 429/144 |
| 2012/0237834 A1 | | 9/2012 | Ogasa | |
| 2013/0316250 A1 | * | 11/2013 | Khalifah ............. | H01M 4/5825 429/318 |
| 2014/0287302 A1 | | 9/2014 | Fukunaga et al. | |
| 2015/0280220 A1 | | 10/2015 | Ikeda et al. | |
| 2015/0303470 A1 | * | 10/2015 | Honma ............... | H01M 4/5825 429/221 |

FOREIGN PATENT DOCUMENTS

| | | |
|---|---|---|
| JP | 1-302606 | 12/1989 |
| JP | 2-18803 | 1/1990 |
| JP | 5-205741 | 8/1993 |
| JP | 2005-290325 | 10/2005 |
| JP | 2010-15782 | 1/2010 |

(Continued)

OTHER PUBLICATIONS

International Preliminary Report on Patentability dated Jun. 14, 2016 in International Application No. PCT/JP2014/081773.

(Continued)

*Primary Examiner* — Douglas J McGinty
(74) *Attorney, Agent, or Firm* — Wenderoth, Lind & Ponack, L.L.P.

(57) ABSTRACT

A composite material as an electrode for a sodium ion secondary battery includes an active material crystal, a sodium-ion conductive crystal, and an amorphous phase. The active material crystal may contain Na, M (where M represents at least one kind of transition metal element selected from Cr, Fe, Mn, Co, and Ni), P, and O.

17 Claims, 1 Drawing Sheet

(56) References Cited

FOREIGN PATENT DOCUMENTS

| JP | 2012-209256 | 10/2012 |
| JP | 2013-161646 | 8/2013 |
| WO | 2013/065787 | 5/2013 |
| WO | 2013/069597 | 5/2013 |
| WO | 2013/133369 | 9/2013 |

OTHER PUBLICATIONS

International Search Report dated Feb. 24, 2015 in International Application No. PCT/JP2014/081773.

* cited by examiner

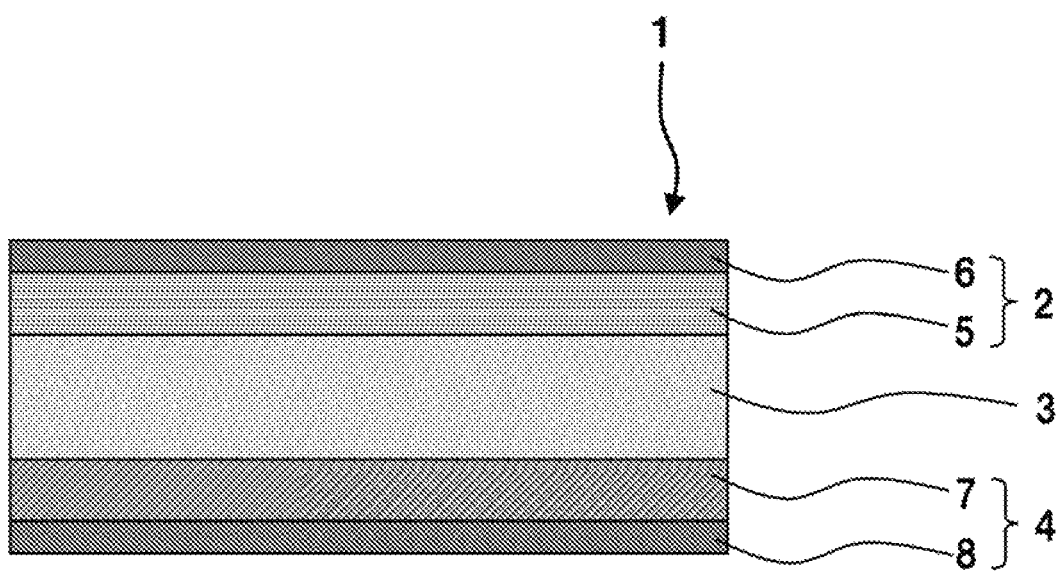

COMPOSITE MATERIAL AS ELECTRODE FOR SODIUM ION BATTERIES, PRODUCTION METHOD THEREFOR, AND ALL-SOLID-STATE SODIUM BATTERY

TECHNICAL FIELD

The present invention relates to a composite material as an electrode for a sodium ion battery to be used for portable electronic devices, electric vehicles, or the like, a production method therefor, and an all-solid-state sodium battery.

BACKGROUND ART

In recent years, along with widespread use of portable personal computers and portable phones, it has been highly demanded to develop electricity storage devices, such as a lithium ion secondary battery, having higher capacity and a reduced size. However, existing electricity storage devices, such as a lithium ion secondary battery, mainly use an organic electrolytic solution as an electrolyte. The organic electrolytic solution exhibits high ion conductivity, but has possibilities of leakage, ignition, and the like when used for the electricity storage devices because the organic electrolytic solution is a liquid and flammable.

In order to solve the above-mentioned problem and secure intrinsic safety, an all-solid-state battery which uses a solid electrolyte instead of the organic electrolytic solution and whose positive electrode and negative electrode are each formed of solids has been developed. Such all-solid-state battery uses the solid electrolyte, and hence has no concerns of ignition and liquid leakage, and is less liable to cause problems of deterioration in battery performance owing to corrosion, and the like. Of the all-solid-state batteries, an all-solid-state lithium ion battery has been actively developed in various fields (for example, see Patent Literature 1).

Meanwhile, with regard to lithium to be used for the all-solid-state lithium ion battery, there are concerns globally about price increase and depletion of its raw material. Attention has been focused on a sodium ion as an alternative to a lithium ion, and also an all-solid-state sodium ion battery has been developed (for example, see Patent Literature 2).

CITATION LIST

Patent Literature 1: JP 05-205741 A
Patent Literature 2: JP 2010-15782 A

SUMMARY OF INVENTION

Technical Problem

In order to achieve a high capacity, a high power, and a long lifetime of an all-solid-state sodium battery, it is necessary to increase sodium ion conductivity in an electrode, and to form a dense composite material as an electrode. However, in a related-art production process of a composite material as an electrode, a dense composite material as an electrode was not able to be formed through general firing.

Thus, an object of the present invention is to provide a composite material as an electrode for a sodium ion battery which is dense, is excellent in sodium ion conductivity, and enables a high power, and an all-solid-state sodium battery.

Solution to Problem

A composite material as an electrode for a sodium ion secondary battery according to one embodiment of the present invention comprises an active material crystal, a sodium-ion conductive crystal, and an amorphous phase.

In the composite material as an electrode for a sodium ion secondary battery according to the one embodiment of the present invention, it is preferred that the active material crystal contain Na, M, where M represents at least one kind of transition metal element selected from Cr, Fe, Mn, Co, and Ni, P, and O.

Further, it is preferred that the active material crystal comprise a triclinic crystal belonging to a space group P1 or P-1.

Further, it is preferred that the active material crystal comprise a crystal represented by the general formula $Na_xM_yP_2O_7$, where x satisfies $1.20 \le x \le 2.80$ and y satisfies $0.95 \le y \le 1.60$.

In the composite material as an electrode for a sodium ion secondary battery according to the one embodiment of the present invention, it is preferred that the active material crystal contain at least one kind selected from Nb and Ti, and O.

Further, it is preferred that the active material crystal contain Na and/or Li.

In the composite material as an electrode for a sodium ion secondary battery according to the one embodiment of the present invention, it is preferred that the active material crystal comprise an orthorhombic crystal, a hexagonal crystal, a cubic crystal, or a monoclinic crystal.

Further, it is preferred that the active material crystal comprise a monoclinic crystal belonging to a space group $P2_1/m$.

In the composite material as an electrode for a sodium ion secondary battery according to the one embodiment of the present invention, it is preferred that the active material crystal comprise a crystal of at least one kind of metal selected from Sn, Bi, and Sb.

In the composite material as an electrode for a sodium ion secondary battery according to the one embodiment of the present invention, it is preferred that the sodium-ion conductive crystal contain at least one kind selected from Al, Y, Zr, Si, and P, Na, and O.

Further, it is preferred that the sodium-ion conductive crystal comprise a monoclinic crystal, a hexagonal crystal, or a trigonal crystal.

In the composite material as an electrode for a sodium ion secondary battery according to the one embodiment of the present invention, it is preferred that the amorphous phase contain at least one kind selected from P, B, and Si, Na, and O.

An all-solid-state sodium battery according to one embodiment of the present invention comprises a positive electrode that is constituted by the above-mentioned composite material as an electrode for a sodium ion secondary battery.

An all-solid-state sodium battery according to one embodiment of the present invention comprises a negative electrode that is constituted by the above-mentioned composite material as an electrode for a sodium ion secondary battery.

A method of producing the composite material as an electrode for a sodium ion secondary battery according to one embodiment of the present invention comprises firing raw powder material containing crystallizable glass powder, to form the amorphous phase.

Advantageous Effects of Invention

According to the present invention, it becomes able to provide the composite material as an electrode for a sodium ion battery which is dense, is excellent in sodium ion conductivity, and enables a high power, and the all-solid-state sodium battery.

BRIEF DESCRIPTION OF DRAWINGS

FIG. 1 is a sectional schematic view for illustrating one exemplary embodiment of an all-solid-state battery.

DESCRIPTION OF EMBODIMENTS (1) Composite Material as an Electrode for Sodium Ion Secondary Battery A composite material as an electrode for a sodium ion secondary battery of an embodiment comprises an active material crystal, a sodium-ion conductive crystal, and an amorphous phase. The composite material as an electrode for a sodium ion secondary battery comprises the amorphous phase in addition to the active material crystal and the sodium-ion conductive crystal, and hence the amorphous phase is easily present at an interface between the active material crystal and the sodium-ion conductive crystal. As a result, interface resistance between the active material crystal and the sodium-ion conductive crystal, which serves as a sodium ion conduction path, easily reduces at the time of charge and discharge of a sodium ion secondary battery, and hence the charge-discharge capacity and battery voltage of the sodium ion secondary battery easily increase.

In addition, when the composite material as an electrode, which comprises the amorphous phase, is used for an all-solid-state sodium battery, an interface between the composite material as an electrode and a sodium-ion conductive solid electrolyte layer is increased in bonding strength by virtue of the amorphous phase, and hence the charge-discharge capacity and battery voltage of the all-solid-state sodium battery easily tends to increase.

Constituent components of the composite material as an electrode for a sodium ion secondary battery of the embodiment are described in detail below.

(1-a) Active Material Crystal

The active material crystal acts as a positive electrode active material or a negative electrode active material, and can store and release sodium ions at the time of charging and discharging.

Examples of the active material crystal acting as a positive electrode active material may include a layered sodium transition metal oxide crystal, such as $NaCrO_2$, $Na_{0.7}MnO_2$, or $NaFe_{0.2}Mn_{0.4}Ni_{0.4}O_2$, and a sodium transition metal phosphate crystal containing Na, M (M represents at least one kind of transition metal element selected from Cr, Fe, Mn, Co, and Ni), P, and O, such as $Na_2FeP_2O_7$, $NaFePO_4$, or $Na_3V_2(PO_4)_3$.

In particular, a crystal containing Na, M, P, and O is preferred by virtue of a high capacity and excellent chemical stability. Of those, a triclinic crystal belonging to the space group P1 or P-1, particularly a crystal represented by the general formula $Na_xM_yP_2O_7$ (x satisfies $1.20 \leq x \leq 2.80$ and y satisfies $0.95 \leq y \leq 1.60$) is preferred by virtue of excellent cycle performance.

Examples of the active material crystal acting as a negative electrode active material may include a crystal containing at least one kind selected from Nb and Ti, and O, and a crystal of at least one kind of metal selected from Sn, Bi, and Sb.

The crystal containing at least one kind selected from Nb and Ti, and O is preferred by virtue of excellent cycle performance. When the crystal containing at least one kind selected from Nb and Ti, and O further contains Na and/or Li, such crystal is preferred because charge and discharge efficiency (rate of a discharge capacity to a charge capacity) increases, and a high charge-discharge capacity can be maintained. Of such crystals, when the crystal containing at least one kind selected from Nb and Ti, and O is an orthorhombic crystal, a hexagonal crystal, a cubic crystal, or a monoclinic crystal, in particular a monoclinic crystal belonging to the space group $P2_1/m$, such crystal is more preferred because a reduction in capacity is less liable to occur even through charging and discharging at a high current. An example of the orthorhombic crystal is $NaTi_2O_4$. Examples of the hexagonal crystal include $Na_2TiO_3$, $NaTi_8O_{13}$, $NaTiO_2$, $LiNbO_3$, $LiNbO_2$, $Li_7NbO_6$, $LiNbO_2$, and $Li_2Ti_3O_7$. Examples of the cubic crystal include $Na_2TiO_3$, $NaNbO_3$, $Li_4Ti_5O_{12}$, and $Li_3NbO_4$. Examples of the monoclinic crystal include $Na_2Ti_6O_{13}$, $NaTi_2O_4$, $Na_2TiO_3$, $Na_4Ti_5O_{12}$, $Na_2Ti_4O_9$, $Na_2Ti_9O_{19}$, $Na_2Ti_3O_7$, $Na_2Ti_3O_7$, $Li_{1.7}Nb_2O_5$, $Li_{1.9}Nb_2O_5$, $Li_{12}Nb_{13}O_{33}$, and $LiNb_3O_8$. An example of the monoclinic crystal belonging to the space group $P2_1/m$ is $Na_2Ti_3O_7$.

It is preferred that the crystal containing at least one kind selected from Nb and Ti, and O further contain at least one kind selected from B, Si, P, and Ge. Those components facilitate the formation of the active material crystal and the amorphous phase, and have an effect of improving sodium ion conductivity.

Other than the above, the crystal of at least one kind of metal selected from Sn, Bi, and Sb, or glass containing at least one kind selected from Sn, Bi, and Sb may be used. The crystal or glass is preferred because a high capacity is exhibited, and a reduction in capacity is less liable to occur even through charging and discharging at a high current.

(1-b) Sodium-Ion Conductive Crystal

The sodium-ion conductive crystal is a crystal which acts as a sodium ion conduction path between the active material crystal and a counter electrode, is excellent in sodium ion conductivity, and has high electronic insulating properties. When the sodium-ion conductive crystal is not present, sodium ion transfer resistance between the active material crystal and the counter electrode becomes very high, resulting in a reduction in charge-discharge capacity or battery voltage. It is preferred that the sodium-ion conductive crystal contain at least one kind selected from Al, Y, Zr, Si, and P, Na, and O. With such configuration, the sodium-ion conductive crystal is excellent in sodium ion conductivity, can be increased in electronic insulating properties, and further, is excellent in stability.

The sodium-ion conductive crystal is preferably formed of a compound represented by the general formula $Na_sA1_tA2_uO_v$ (A1 represents at least one kind selected from Al, Y, Yb, Nd, Nb, Ti, Hf, and Zr, A2 represents at least one kind selected from Si and P, s represents from 1.4 to 5.2, t represents from 1 to 2.9, u represents from 2.8 to 4.1, and v represents from 9 to 14). Herein, A1 preferably represents at least one kind selected from Y, Nb, Ti, and Zr, and s, t, u, and v preferably are in the following ranges: s=2.5 to 3.5, t=1 to 2.5, u=2.8 to 4, and v=9.5 to 12. With this, a crystal excellent in ion conductivity can be obtained.

The sodium-ion conductive crystal is particularly preferably a NASICON crystal. The following crystal is preferred as the NASICON crystal: $Na_3Zr_2Si_2PO_{12}$, $Na_{3.2}Zr_{1.3}Si_{2.2}P_{0.3}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, $Na_{3.6}Zr_{0.13}Yb_{1.67}Si_{0.11}P_{2.9}O_{12}$, or the like. In particular, $Na_{3.12}Zr_{1.88}Y_{0.12}Si_2PO_{12}$ is preferred by virtue of excellent sodium ion conductivity.

When the sodium-ion conductive crystal is a monoclinic crystal, a hexagonal crystal, or a trigonal crystal, such sodium-ion conductive crystal is more preferred because the sodium ion conductivity is further increased.

Also beta-alumina, which is excellent in sodium ion conductivity, is preferred as a sodium-ion conductive solid electrolyte. The beta-alumina includes two kinds of crystal types: β-alumina (theoretical composition formula: $Na_2O.11Al_2O_3$); and β"-alumina (theoretical composition formula: $Na_2O.5.3Al_2O_3$). β"-alumina is a metastable substance, and hence β"-alumina to which $Li_2O$ or MgO is added as a stabilizer is generally used. β"-Alumina has high sodium ion conductivity as compared to β-alumina, and hence it is preferred to use β"-alumina alone, or a mixture of β"-alumina and β-alumina. It is more preferred to use $Li_2O$-stabilized β"-alumina $(Na_{1.7}Li_{0.3}Al_{10.7}O_{17})$ or MgO-stabilized β"-alumina $((Al_{10.32}Mg_{0.68}O_{16})(Na_{1.68}O))$.

Other than the above, $Na_5YSi_4O_{12}$ may be used as the sodium-ion conductive solid electrolyte.

(1-c) Amorphous Phase

As described above, the amorphous phase acts as a sodium ion conduction path at a crystal interface between the active material crystal and the sodium-ion conductive crystal, and has an effect of improving the sodium ion conductivity of the composite material as an electrode.

When the amorphous phase contains at least one kind selected from P, B, and Si, Na, and O, such amorphous phase is preferred by virtue of excellent sodium ion conductivity and excellent chemical durability.

(1-d) Other Components

It is preferred that the composite material as an electrode further comprise a conductive agent. The conductive agent is a component to be added in order to achieve a high capacity and a high rate of the composite material as an electrode. Specific examples of the conductive agent include highly conductive carbon black, such as acetylene black or ketjen black, graphite, coke, and metal powder, such as Ni powder, Cu powder, or Ag powder. Of those, it is preferred to use any one of highly conductive carbon black, Ni powder, and Cu powder each exhibiting excellent conductivity even when added in a very small amount.

(2) All-Solid-State Sodium Battery

An all-solid-state sodium battery of the embodiment uses the composite material as an electrode for a sodium ion secondary battery for a positive electrode or a negative electrode. FIG. 1 is a sectional schematic view for illustrating one exemplary embodiment of the all-solid-state battery. In an all-solid-state sodium battery 1 illustrated in FIG. 1, a positive electrode 2, a sodium-ion conductive solid electrolyte layer 3, and a negative electrode 4 are laminated in the stated order. The positive electrode 2 comprises a positive composite material 5 as an electrode, and a positive electrode current collector 6 configured to collect a current of the positive composite material 5 as an electrode in the stated order from the side of the sodium-ion conductive solid electrolyte layer 3. The negative electrode 4 comprises a negative composite material 7 as an electrode, and a negative electrode current collector 8 configured to collect a current of the negative composite material 7 as an electrode in the stated order from the side of the sodium-ion conductive solid electrolyte layer 3. In the all-solid-state sodium battery 1, the positive composite material 5 as an electrode or the negative composite material 7 as an electrode comprises the amorphous phase, and hence an interface between the positive electrode 2 and the sodium-ion conductive solid electrolyte layer 3 or an interface between the negative electrode 4 and the sodium-ion conductive solid electrolyte layer 3 is increased in bonding strength by virtue of the amorphous phase, with the result that the all-solid-state sodium battery 1 is easily increased in charge-discharge capacity and battery voltage.

(3) Method of Producing Composite Material as an Electrode for Sodium Ion Secondary Battery Next, a method of producing a composite material as an electrode for a sodium ion secondary battery of the embodiment is described.

First, electrode active material crystal powder or active material crystal precursor powder is prepared. In addition, sodium-ion conductive crystal powder or sodium-ion conductive crystal precursor powder is prepared. Those powders are obtained by blending raw powder materials, and subjecting the obtained raw powder materials to a melting process, a sol-gel process, a chemical vapor deposition process, such as spraying of solution mist into flame, a mechanochemical process, or the like. The active material crystal precursor powder and the sodium-ion conductive crystal precursor powder are each crystallizable glass powder (glass powder having a property of precipitating a crystal through heat treatment).

The active material crystal powder and the active material crystal precursor powder each have an average particle diameter D50 of preferably 15 μm or less, more preferably 10 μm or less, still more preferably 5 μm or less. When the average particle diameters D50 of the active material crystal powder and the active material crystal precursor powder are too large, sodium ion diffusion resistance increases, and battery performance tends to deteriorate. On the other hand, lower limits of the average particle diameters D50 of the active material crystal powder and the active material crystal precursor powder are not particularly limited, but are each 0.1 μm or more practically.

The sodium-ion conductive crystal powder and the sodium-ion conductive crystal precursor powder each have an average particle diameter D50 of preferably 25 μm or less, more preferably 20 μm or less, still more preferably 15 μm or less. When the average particle diameters D50 of the sodium-ion conductive crystal powder and the sodium-ion conductive crystal precursor powder are too large, a gap between particles becomes large, and the composite material as an electrode tends to have poor density. On the other hand, lower limits of the average particle diameters D50 of the sodium-ion conductive crystal powder and the sodium-ion conductive crystal precursor powder are not particularly limited, but are each 0.1 μm or more practically.

The composite material as an electrode for a sodium ion secondary battery comprising the active material crystal, the sodium-ion conductive crystal, and the amorphous phase can be obtained by mixing the electrode active material crystal precursor powder and the sodium-ion conductive crystal powder, and then subjecting the mixed powders to press molding, or applying a slurry of the mixed powders onto one surface of the sodium-ion conductive solid electrolyte layer, followed by firing. In this case, the amorphous phase is a reaction product between the active material crystal precursor powder and the sodium-ion conductive crystal powder, and is formed at an interface between the active material crystal and the sodium-ion conductive crystal in the obtained composite material as an electrode.

Further, the composite material as an electrode for a sodium ion secondary battery comprising the active material crystal, the sodium-ion conductive crystal, and the amorphous phase can be also obtained by mixing the electrode active material crystal powder and the sodium-ion conductive crystal precursor powder, and then subjecting the mixed powders to press molding, or applying a slurry of the mixed powders onto one surface of the sodium-ion conductive solid electrolyte layer, followed by firing. In this case, the amorphous phase is a reaction product between the active material crystal powder and the sodium-ion conductive crystal precursor powder, and is formed at an interface between the active material crystal and the sodium-ion conductive crystal in the obtained composite material as an electrode.

As described above, when at least any one of the active material crystal precursor powder or the sodium-ion conductive crystal precursor powder (that is, crystallizable glass powder) is used as a raw material, the composite material as an electrode for a sodium ion secondary battery comprising the amorphous phase can be obtained.

As a firing atmosphere, there is given an air atmosphere, an inert atmosphere ($N_2$ or the like), or a reducing atmosphere ($H_2$, $NH_3$, CO, $H_2S$, $SiH_4$, or the like). A firing temperature (maximum temperature) is preferably from 400° C. to 900° C., particularly preferably from 420° C. to 800° C. When the firing temperature is too low, a desired active material crystal is difficult to precipitate, or it becomes difficult to sufficiently sinter the raw powder materials. On the other hand, when the firing temperature is too high, the precipitated active material crystal may dissolve. A retention time at the maximum firing temperature is preferably from 10 minutes to 600 minutes, more preferably from 30 minutes to 120 minutes. When the retention time is too short, sintering of the raw powder materials is liable to be insufficient. On the other hand, when the retention time is too long, the raw powder materials excessively fuse with each other to form coarse particles. As a result, the specific surface area of the electrode active material reduces, and the charge-discharge capacity is liable to reduce. For the firing, an electric heating furnace, a rotary kiln, a microwave heating furnace, a high-frequency heating furnace, or the like may be used.

The element M in the electrode active material crystal represented by the general formula $Na_xM_yP_2O_7$ (x satisfies $1.20 \leq x \leq 2.80$, and y satisfies $0.95 \leq y \leq 1.60$, and M represents at least one kind of transition metal element selected from Cr, Fe, Mn, Co, and Ni) is divalent, whereas the element M in the precursor powder is generally trivalent. Therefore, in order to reduce the element M in the precursor powder from trivalent to divalent, the firing needs to be performed at relatively high temperature (for example, 620° C. or more). However, for example, when the positive composite material as an electrode containing the precursor powder, and a NASICON crystal or beta-alumina as solid electrolyte powder, is fired at high temperature, there is a problem in that a positive electrode active material and a solid electrolyte react with each other to precipitate a malysite-type $NaFePO_4$ crystal which does not contribute to charging and discharging, with the result that the charge-discharge capacity is liable to reduce. Thus, in order to solve the problem, the firing is preferably performed in a reducing atmosphere. With this, the reduction of the element M is promoted, and hence the element M in the precursor powder can be sufficiently reduced from trivalent to divalent even through firing at relatively low temperature (for example, from 400° C. to 610° C., from 410° C. to 580° C., from 420° C. to 500° C., particularly from 425° C. to 450° C.). As a result, the precipitation of the malysite-type $NaFePO_4$ crystal is suppressed, and the desired $Na_xM_yP_2O_7$ crystal can be obtained.

When $H_2$ is used as a reducing gas, it is preferred to mix an inert gas, such as $N_2$, in order to reduce an explosion risk or the like at the time of firing. Specifically, the reducing gas contains, in terms of vol %, preferably 90% to 99.9% of $N_2$ and 0.1% to 10% of $H_2$, or 90% to 99.5% of $N_2$ and 0.5% to 10% of $H_2$, particularly preferably 92% to 99% of $N_2$ and 1% to 4% of $H_2$.

The mixing ratio between the active material crystal powder or the active material crystal precursor powder, and the sodium-ion conductive crystal powder or the sodium-ion conductive crystal precursor powder is appropriately adjusted in the range of, for example, from 99:1 to 1:99, preferably from 90:10 to 10:90 in terms of mass ratio. For example, it is preferred that the ratio of the active material crystal powder or the active material crystal precursor powder be adjusted so that the ratio becomes lower in a region closer to the sodium-ion conductive solid electrolyte layer 3 of FIG. 1 and becomes higher in a region closer to the positive electrode 2 or the negative electrode 4 of FIG. 1.

In addition, it is preferred that the conductive agent be contained in a content of from 1 part by mass to 15 parts by mass, more preferably from 1.2 parts by mass to 8 parts by mass with respect to 100 parts by mass of the total amount of the active material crystal powder or the active material crystal precursor powder, and the sodium-ion conductive crystal powder or the sodium-ion conductive crystal precursor powder. When the content of the conductive agent is too small, the composite material as an electrode tends to have a difficulty in achieving a high capacity and a high rate. On the other hand, when the content of the conductive agent is too large, the charge-discharge capacity tends to reduce owing to a reduction in the amount of the active material per unit mass of the composite material as an electrode. In addition, the ion conduction path is cut off through inhibition of sintering, so that the charge-discharge capacity tends to reduce or a discharge voltage tends to reduce.

EXAMPLES

The present invention is described in detail by way of Examples below, but the present invention is not limited to these Examples.

(Preparation of Positive Electrode Active Material Crystal Precursor Powder)

Sodium metaphosphate ($NaPO_3$), ferric oxide ($Fe_2O_3$), and orthophosphoric acid ($H_3PO_4$) were used as raw materials. The raw powder materials were blended so as to achieve the following composition in terms of mol %: 40.0% of $Na_2O$, 20.0% of $Fe_2O_3$, and 40.0% of $P_2O_5$, and melted at 1250° C. for 45 minutes in an air atmosphere. After that, the molten glass was poured between a pair of rollers to be formed into a film shape while rapidly cooled. Thus, a positive electrode active material crystal precursor was prepared.

The obtained positive electrode active material crystal precursor was pulverized with a ball mill using $Al_2O_3$ balls of φ 20 mm for 5 hours, and then pulverized with a ball mill using $ZrO_2$ balls of φ 5 mm in ethanol for 40 hours. Thus, positive electrode active material crystal precursor powder having an average particle diameter D50 of 2.0 μm was obtained. In Examples 9 and 10, positive electrode active material crystal precursor powder having an average particle diameter D50 of 0.7 μm prepared as described below was used. The positive electrode active material crystal precursor obtained above was pulverized with a ball mill using $ZrO_2$ balls of φ 20 mm for 5 hours, and then passed through a sieve made of a resin having an opening of 120 μm. Thus, glass coarse powder having an average particle diameter of from 3 μm to 15 μm was obtained. Next, the glass coarse powder was pulverized with a ball mill using $ZrO_2$ balls of φ 3 mm for 80 hours through use of ethanol as a pulverization agent. Thus, the positive electrode active material crystal precursor powder having an average particle diameter of 0.7 μm was obtained.

For confirmation of an active material crystal to be precipitated, 93% of the obtained positive electrode active material crystal precursor powder and 7% of acetylene black (Super C65 manufactured by Timcal) in terms of mass % were sufficiently mixed, and then subjected to heat treatment at 450° C. for 1 hour in a mixed gas atmosphere of nitrogen and hydrogen (nitrogen: 96 vol %, hydrogen: 4 vol %). The powder X-ray diffraction pattern of the powder after the heat treatment was investigated. As a result, a diffraction line derived from a triclinic crystal ($Na_2FeP_2O_7$) belonging to the space group P-1 was confirmed. The powder X-ray diffraction pattern was measured with an X-ray diffractometer (RINT2000 manufactured by Rigaku Corporation).

(Preparation of Negative Electrode Active Material Crystal Precursor Powder)

Sodium carbonate ($Na_2CO_3$), titanium oxide ($TiO_2$), and anhydrous boric acid ($B_2O_3$) were used as raw materials. The raw powder materials were blended so as to achieve the following composition in terms of mol %: 36.0% of $Na_2O$, 49.0% of $TiO_2$, and 15.0% of $B_2O_3$, and melted at 1300° C. for 1 hour in an air atmosphere. After that, the molten glass was poured between a pair of rollers to be formed into a film shape while rapidly cooled. Thus, a negative electrode active material crystal precursor was prepared.

The obtained negative electrode active material crystal precursor was pulverized with a ball mill using $Al_2O_3$ balls of φ 20 mm for 20 hours. After that, the resultant was subjected to air classification with an air classifier (MDS-1 type manufactured by Nippon Pneumatic Mfg. Co., Ltd.). Thus, negative electrode active material crystal precursor powder having an average particle diameter D50 of 2.0 μm was obtained.

For confirmation of an active material crystal to be precipitated, the obtained negative electrode active material crystal precursor powder was subjected to heat treatment at 800° C. for 1 hour in an air atmosphere. The powder X-ray diffraction pattern of the powder after the heat treatment was investigated. As a result, a diffraction line derived from a monoclinic crystal ($Na_2Ti_3O_7$) belonging to the space group $P2_1/m$ was confirmed.

(Preparation of Sodium-Ion Conductive Crystal A Powder)

Sodium carbonate ($Na_2CO_3$), aluminum oxide ($Al_2O_3$), and magnesium oxide (MgO) were used as raw materials. The raw powder materials were blended so as to achieve the following composition in terms of mol %: 13.0% of $Na_2O$, 80.2% of $Al_2O_3$, and 6.8% of MgO, and then fired at 1250° C. for 4 hours in an air atmosphere. The powder after the firing was pulverized with a ball mill using $Al_2O_3$ balls of φ 20 mm for 24 hours, and then subjected to air classification. Thus, powder having an average particle diameter D50 of 2.0 μm was obtained. The obtained powder was subjected to heat treatment at 1640° C. for 1 hour in an air atmosphere. Thus, sodium-ion conductive crystal A powder was obtained. The obtained sodium-ion conductive crystal A powder was immediately transferred to an environment having a dew point of −40° C. or less, and stored.

The powder X-ray diffraction pattern of the sodium-ion conductive crystal A powder was investigated. As a result, a diffraction line derived from a trigonal crystal (β"-alumina [$(Al_{10.32}Mg_{0.68}O_{16})(Na_{1.68}O)$]) belonging to the space group R-3m was confirmed.

(Preparation of Sodium-Ion Conductive Crystal B Powder)

Sodium metaphosphate ($NaPO_3$), zirconium oxide, ($ZrO_2$), sodium carbonate ($Na_2CO_3$), and silicon dioxide ($SiO_2$) were used as raw materials. The raw powder materials were blended so as to achieve the following composition in terms of mol %: 29.1% of $Na_2O$, 23.6% of $ZrO_2$, 7.3% of $P_2O_5$, and 40% of $SiO_2$, and then fired at 1150° C. for 1 hour in an air atmosphere. The powder after the firing was pulverized with a ball mill using $Al_2O_3$ balls of φ 20 mm for 24 hours, and then subjected to air classification. Thus, powder having an average particle diameter D50 of 2.0 μm was obtained. The obtained powder was subjected to heat treatment at 1300° C. for 2 hours in an air atmosphere. Thus, sodium-ion conductive crystal B powder was obtained. The obtained sodium-ion conductive crystal B powder was immediately transferred to an environment having a dew point of −40° C. or less, and stored.

The powder X-ray diffraction pattern of the sodium-ion conductive crystal B powder was investigated. As a result, a diffraction line derived from a trigonal crystal ($Na_{2.6}Zr_2Si_{1.6}P_{1.4}O_{12}$) belonging to the space group R-3c was confirmed.

(Preparation of Sodium-Ion Conductive Crystal C Powder)

Sodium metaphosphate ($NaPO_3$), yttria-stabilized zirconia (($ZrO_2)_{0.07}(Y_2O_3)_{0.03}$), sodium carbonate ($Na_2CO_3$), and silicon dioxide ($SiO_2$) were used as raw materials. The raw powder materials were blended so as to achieve the following composition in terms of mol %: 25.3% of $Na_2O$, 31.6% of $ZrO_2$, 1.0% of $Y_2O_3$, 8.4% of $P_2O_5$, and 33.7% of $SiO_2$, and then fired at 1100° C. for 8 hours in an air atmosphere. The powder after the firing was pulverized with a ball mill using $Al_2O_3$ balls of φ 20 mm for 24 hours, and then subjected to air classification. Thus, powder having an average particle diameter D50 of 2.0 μm was obtained. The obtained powder was subjected to heat treatment at 1250° C. for 40 hours in an air atmosphere. Thus, sodium-ion conductive crystal C powder was obtained. The obtained sodium-ion conductive crystal C powder was immediately transferred to an environment having a dew point of −40° C. or less, and stored.

The powder X-ray diffraction pattern of the sodium-ion conductive crystal C powder was investigated. As a result, a diffraction line derived from a trigonal crystal ($Na_{3.05}Zr_2Si_{2.05}P_{0.95}O_{12}$) belonging to the space group R-3c was confirmed.

(Preparation of Sodium-Ion Conductive Crystal D Precursor Powder)

Sodium metaphosphate ($NaPO_3$), yttrium oxide ($Y_2O_3$), sodium carbonate ($Na_2CO_3$), and silicon dioxide ($SiO_2$) were used as raw materials. The raw powder materials were blended so as to achieve the following composition in terms of mol %: 38.2% of $Na_2O$, 5.9% of $Y_2O_3$, 2.9% of $P_2O_5$, and 52.9% of $SiO_2$, and then melted at 1550° C. for 4 hours in an air atmosphere. After that, the molten glass was poured between a pair of rollers to be formed into a film shape while rapidly cooled. Thus, a sodium-ion conductive crystal D precursor was prepared.

The obtained sodium-ion conductive crystal D precursor was pulverized with a ball mill using $Al_2O_3$ balls of φ 20 mm for 24 hours, and then subjected to air classification. Thus, sodium-ion conductive crystal D precursor powder having an average particle diameter D50 of 2.0 μm was obtained.

The obtained sodium-ion conductive crystal D precursor powder was immediately transferred to an environment having a dew point of −40° C. or less, and stored.

For confirmation of a sodium-ion conductive crystal to be precipitated, the obtained sodium-ion conductive crystal D precursor powder was subjected to heat treatment at 800° C. for 1 hour in an air atmosphere. The powder X-ray diffraction pattern of the powder after the heat treatment was investigated. As a result, a diffraction line derived from a trigonal crystal ($Na_5YSi_4O_{12}$) belonging to the space group R-3c was confirmed.

(Preparation of Sodium-Ion Conductive Crystal E Powder)

$Li_2O$-stabilized β"-alumina represented by the composition formula: $Na_{1.7}Li_{0.3}Al_{10.7}O_{17}$ manufactured by Ionotec Ltd. was processed into a sheet shape having a thickness of 0.5 mm. $Li_2O$-stabilized β"-alumina in the sheet shape was pulverized with a mortar and pestle made of agate, and then passed through a sieve having an opening of 20 μm. Thus, a solid electrolyte in a powder form having an average particle diameter of 17 μm was obtained.

Example 1

(Preparation of Composite Material as an Electrode)

60% of the positive electrode active material crystal precursor powder, 35% of the sodium-ion conductive crystal A powder, and 5% of acetylene black (Super C65 manufactured by Timcal) were weighed in terms of mass %, and mixed with a mortar and pestle made of agate for about 30 minutes. 20 Parts by mass of N-methylpyrrolidone containing 10 mass % of polypropylene carbonate (manufactured by Sumitomo Seika Chemicals Company Limited) was added to 100 parts by mass of the mixed powders, and the resultant was sufficiently stirred with a planetary centrifugal mixer, to provide a slurry. All the above-mentioned operations were performed in an environment having a dew point of −40° C. or less.

The obtained slurry was applied onto one surface of a sodium-ion conductive solid electrolyte layer having a thickness of 0.5 mm formed of β"-alumina (manufactured by Ionotec Ltd., composition formula: $Na_{1.7}Li_{0.3}Al_{10.7}O_{17}$) so as to have an area of 1 cm² and a thickness of 200 μm, and then dried at 70° C. for 3 hours. Next, the resultant was fired at 450° C. for 1 hour in a mixed gas atmosphere of nitrogen and hydrogen (nitrogen: 96 vol %, hydrogen: 4 vol %) to form a composite material as an electrode (positive composite material as an electrode) on the one surface of the sodium-ion conductive solid electrolyte layer. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal (β"-alumina [$(Al_{10.32}Mg_{0.68}O_{16})(Na_{1.68}O)$]) belonging to the space group R-3m, which is a sodium-ion conductive crystal, were confirmed. In addition, the obtained composite material as an electrode was observed with a transmission electron microscope (TEM). As a result, a lattice image corresponding to a crystal structure was not observed in a certain region. Thus, the presence of an amorphous phase was confirmed.

(Preparation of Test Battery)

Next, a current collector formed of a gold electrode having a thickness of 300 nm was formed on the surface of the positive composite material as an electrode with a sputtering device (SC-701AT manufactured by Sanyu Electron Co., Ltd.). After that, metal sodium, which was to serve as a counter electrode, was pressure bonded onto the other surface of the sodium-ion conductive solid electrolyte layer in an argon atmosphere having a dew point of −60° C. or less. The resultant was placed on a lower lid of a coin cell, and then covered with an upper lid. Thus, a CR2032-type test battery was prepared.

(Charge and Discharge Test)

The obtained test battery was used to be subjected to a charge and discharge test at 70° C., and a charge-discharge capacity and an average discharge voltage were measured. The results are shown in Table 1.

In the charge and discharge test, charge (release of sodium ions from the positive electrode active material) was performed from an open circuit voltage (OCV) to 4 V at a constant current (CC), and discharge (storage of sodium ions in the positive electrode active material) was performed from 4 V to 2 V at CC. The C rate was set to 0.02 C. The charge-discharge capacity was defined as a quantity of electricity discharged per unit weight of the positive electrode active material in the positive composite material as an electrode.

Example 2

A composite material as an electrode (positive composite material as an electrode) was formed by the same method as in Example 1 except that the sodium-ion conductive crystal B powder was used instead of the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_{2.6}Zr_2Si_{1.6}P_{1.4}O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 3

A composite material as an electrode (positive composite material as an electrode) was formed by the same method as in Example 1 except that the sodium-ion conductive crystal C powder was used instead of the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_{3.05}Zr_2Si_{2.05}P_{0.95}O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 4

A composite material as an electrode (positive composite material as an electrode) was formed by the same method as in Example 1 except that the sodium-ion conductive crystal D precursor powder was used instead of the sodium-ion conductive crystal A powder and the firing conditions were changed to 700° C. in a nitrogen atmosphere in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 5

A composite material as an electrode (positive composite material as an electrode) was formed by the same method as in Example 4 except that the positive electrode active material crystal precursor powder was subjected to heat treatment at 450° C. for 1 hour in a mixed gas atmosphere of nitrogen and hydrogen (nitrogen: 96 vol %, hydrogen: 4 vol %) before mixing in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 6

A composite material as an electrode (positive composite material as an electrode) was formed by the same method as in Example 1 except that 60% of the positive electrode active material crystal precursor powder, 17.5% of the sodium-ion conductive crystal A powder, 17.5% of the sodium-ion conductive crystal D precursor powder, and 5% of acetylene black were weighed in terms of mass % in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, a diffraction line derived from a trigonal crystal (β"-alumina [($Al_{10.32}Mg_{0.68}O_{16}$)($Na_{1.68}O$)]) belonging to the space group R-3m, which is a sodium-ion conductive crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 7

A composite material as an electrode (positive composite material as an electrode) was formed by the same method as in Example 6 except that the sodium-ion conductive crystal B powder was used instead of the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, a diffraction line derived from a trigonal crystal ($Na_{2.6}Zr_2Si_{1.6}P_{1.4}O_{12}$) belonging to the space group R-3c, which is a sodium-ion conductive crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 8

A composite material as an electrode (positive composite material as an electrode) was formed by the same method as in Example 6 except that the sodium-ion conductive crystal C powder was used instead of the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, a diffraction line derived from a trigonal crystal ($Na_{3.05}Zr_2Si_{2.05}P_{0.95}O_{12}$) belonging to the space group R-3c, which is a sodium-ion conductive crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 9

(Preparation of Composite Material as an Electrode)

76% of the positive electrode active material crystal precursor powder, 21% of the sodium-ion conductive crystal E powder, and 3% of acetylene black (Super C65 manufactured by Timcal) were weighed in terms of mass %, and mixed with a mortar and pestle made of agate for about 30 minutes. 20 Parts by mass of N-methylpyrrolidone containing 10 mass % of polypropylene carbonate (manufactured by Sumitomo Seika Chemicals Company Limited) was added to 100 parts by mass of the mixed powders, and the resultant was sufficiently stirred with a planetary centrifugal mixer, to provide a slurry. All the above-mentioned operations were performed in an environment having a dew point of −40° C. or less.

The obtained slurry was applied onto one surface of a sodium-ion conductive solid electrolyte layer having a thickness of 0.5 mm formed of MgO-stabilized β"-alumina (($Al_{10.32}Mg_{0.68}O_{16})(Na_{1.68}O$)) so as to have an area of 1 cm$^2$ and a thickness of 80 μm, and then dried at 70° C. for 3 hours. Next, the resultant was fired at 450° C. for 1 hour in a mixed gas atmosphere of nitrogen and hydrogen (nitrogen: 96 vol %, hydrogen: 4 vol %) to form a composite material as an electrode (positive composite material as an electrode) on the one surface of the sodium-ion conductive solid electrolyte layer. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from Li$_2$O-stabilized β"-alumina ($Na_{1.7}Li_{0.3}Al_{10.7}O_{17}$), which is a sodium-ion conductive crystal, were confirmed. In addition, the obtained composite material as an electrode was observed with a transmission electron microscope (TEM). As a result, a lattice image corresponding to a crystal structure was not observed in a certain region. Thus, the presence of an amorphous phase was confirmed.

(Preparation of Test Battery)

Next, a current collector formed of a gold electrode having a thickness of 300 nm was formed on the surface of the positive composite material as an electrode with a sputtering device (SC-701AT manufactured by Sanyu Electron Co., Ltd.). After that, metal sodium, which was to serve as a counter electrode, was pressure bonded onto the other surface of the sodium-ion conductive solid electrolyte layer in an argon atmosphere having a dew point of −60° C. or less. The resultant was placed on a lower lid of a coin cell, and then covered with an upper lid. Thus, a CR2032-type test battery was prepared.

(Charge and Discharge Test)

The obtained test battery was used to be subjected to a charge and discharge test at 60° C., and a charge-discharge capacity and an average discharge voltage were measured. The results are shown in Table 1.

In the charge and discharge test, charge (release of sodium ions from the positive electrode active material) was performed from an open circuit voltage (OCV) to 4.3 V at a constant current (CC), and discharge (storage of sodium ions in the positive electrode active material) was performed from 4 V to 2 V at CC. The C rate was set to 0.01 C. The charge-discharge capacity was defined as a quantity of electricity discharged per unit weight of the positive electrode active material in the positive composite material as an electrode.

Example 10

A composite material as an electrode and a test battery were prepared in the same manner as in Example 9 except that the composition of the composite material as an electrode was changed as follows: 81% of the positive electrode active material crystal precursor powder, 17% of the sodium-ion conductive crystal E powder, and 3% of acetylene black. The obtained test battery was used to be subjected to a charge and discharge test by the same method as in Example 9, and a charge-discharge capacity and an average discharge voltage were measured. The results are shown in Table 1.

Comparative Example 1

A composite material as an electrode (positive composite material as an electrode) was formed by the same method as in Example 1 except that the positive electrode active material crystal precursor powder was subjected to heat treatment at 450° C. for 1 hour in a mixed gas atmosphere of nitrogen and hydrogen (nitrogen: 96 vol %, hydrogen: 4 vol %) before mixing with the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal (β"-alumina [($Al_{10.32}Mg_{0.68}O_{16})(Na_{1.68}O$)]) belonging to the space group R-3m, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Comparative Example 2

A composite material as an electrode (positive composite material as an electrode) was formed by the same method as in Comparative Example 1 except that the sodium-ion conductive crystal B powder was used instead of the sodium-ion conductive crystal A powder in the production of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_{2.6}Zr_2Si_{1.6}P_{1.4}O_{12}$) belonging to the space group R-3c, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Comparative Example 3

A composite material as an electrode (positive composite material as an electrode) was formed by the same method as in Comparative Example 1 except that the sodium-ion conductive crystal C powder was used instead of the sodium-ion conductive crystal A powder in the preparation of the composite material as an electrode. The X-ray diffraction pattern of the obtained positive composite material as an electrode was investigated. As a result, a diffraction line derived from a triclinic crystal ($Na_2FeP_2O_7$) belonging to the space group P-1, which is an active material crystal, and a diffraction line derived from a trigonal crystal ($Na_{3.05}Zr_2Si_{2.05}P_{0.95}O_{12}$) belonging to the space group R-3c, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 1. The obtained test battery was used to be subjected to a charge and discharge test by the same method as in Example 1, and a charge-discharge capacity and an average discharge voltage were measured. The results are shown in Table 1.

Example 11

A composite material as an electrode (negative composite material as an electrode) was formed on one surface of a sodium-ion conductive solid electrolyte layer by the same method as in Example 1 except that the negative electrode active material crystal precursor powder was used instead of the positive electrode active material crystal precursor powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal (β"-alumina [($Al_{10.32}Mg_{0.68}O_{16}$)($Na_{1.68}O$)]) belonging to the space group R-3m, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

Next, a current collector formed of a gold electrode having a thickness of 300 nm was formed on the surface of the negative composite material as an electrode with a sputtering device. After that, metal sodium, which was to serve as a counter electrode, was pressure bonded onto the other surface of the sodium-ion conductive solid electrolyte layer in an argon atmosphere having a dew point of −60° C. or less. The resultant was placed on a lower lid of a coin cell, and then covered with an upper lid. Thus, a CR2032-type test battery was prepared.

The obtained test battery was used to be subjected to a charge and discharge test at 70° C., and a charge-discharge capacity and an average discharge voltage were measured. The results are shown in Table 2.

In the charge and discharge test, charge (storage of sodium ions in the negative electrode active material) was performed from an open circuit voltage (OCV) to 0 V at a constant current (CC), and discharge (release of sodium ions from the negative electrode active material) was performed from 0 V to 2 V at CC. The C rate was set to 0.02 C. The charge-discharge capacity was defined as a quantity of electricity discharged per unit weight of the negative electrode active material in the negative composite material as an electrode.

Example 12

A composite material as an electrode (negative composite material as an electrode) was formed by the same method as in Example 11 except that the sodium-ion conductive crystal B powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_{2.6}Zr_2Si_{1.6}P_{1.4}O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 13

A composite material as an electrode (negative composite material as an electrode) was formed by the same method as in Example 11 except that the sodium-ion conductive crystal C powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_{3.05}Zr_2Si_{2.05}P_{0.95}O_{12}$)

belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 14

A composite material as an electrode (negative composite material as an electrode) was formed by the same method as in Example 11 except that the sodium-ion conductive crystal D precursor powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 15

A composite material as an electrode (negative composite material as an electrode) was formed by the same method as in Example 14 except that the negative electrode active material crystal precursor powder was subjected to heat treatment at 800° C. for 1 hour in an air atmosphere before mixing in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 16

A composite material as an electrode (negative composite material as an electrode) was formed by the same method as in Example 11 except that 60% of the negative electrode active material crystal precursor powder, 17.5% of the sodium-ion conductive crystal A powder, 17.5% of the sodium-ion conductive crystal D precursor powder, and 5% of acetylene black were weighed in terms of mass % in preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, a diffraction line derived from a trigonal crystal (β"-alumina [$(Al_{10.32}Mg_{0.68}O_{16})(Na_{1.68}O)$]) belonging to the space group R-3m, which is a sodium-ion conductive crystal, and a diffraction line derived from a trigonal crystal ($Na_5YSi_4O_{12}$) belonging to the space group R-3c, which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 17

A composite material as an electrode (negative composite material as an electrode) was formed by the same method as in Example 16 except that the sodium-ion conductive crystal B powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, a diffraction line derived from a trigonal crystal ($Na_{2.6}Zr_2Si_{1.6}P_{1.4}O_{12}$) belonging to the space group R-3c, which is a sodium-ion conductive crystal, and a diffraction line derived from a trigonal crystal ($Na_5YSi_4O_{12}$), which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Example 18

A composite material as an electrode (negative composite material as an electrode) was formed by the same method as in Example 16 except that the sodium-ion conductive crystal C powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, a diffraction line derived from a trigonal crystal ($Na_{3.05}Zr_2Si_{2.05}P_{0.95}O_{12}$) belonging to the space group R-3c, which is a sodium-ion conductive crystal, and a diffraction line derived from a trigonal crystal ($Na_5YSi_4O_{12}$), which is a sodium-ion conductive crystal, were confirmed. In addition, the obtained composite material as an electrode was observed with a TEM. As a result, a lattice image corresponding to a crystal structure was not observed in a certain region. Thus, the presence of an amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Comparative Example 4

A composite material as an electrode (negative composite material as an electrode) was formed by the same method as in Example 11 except that the negative electrode active material crystal precursor powder was subjected to heat treatment at 800° C. for 1 hour in a nitrogen atmosphere before mixing with the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal (β″-alumina [($Al_{10.32}Mg_{0.68}O_{16}$)($Na_{1.68}O$)]) belonging to the space group R-3m, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Comparative Example 5

A composite material as an electrode (negative composite material as an electrode) was formed by the same method as in Comparative Example 3 except that the sodium-ion conductive crystal B powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_{2.6}Zr_2Si_{1.6}P_{1.4}O_{12}$) belonging to the space group R-3c, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

Comparative Example 6

A composite material as an electrode (negative composite material as an electrode) was formed by the same method as in Comparative Example 3 except that the sodium-ion conductive crystal C powder was used instead of the sodium-ion conductive crystal A powder in the preparation of the composite material as an electrode. The X-ray diffraction pattern of the obtained negative composite material as an electrode was investigated. As a result, a diffraction line derived from a monoclinic crystal ($Na_2Ti_3O_7$) belonging to the space group $P2_1/m$, which is an active material crystal, and a diffraction line derived from a trigonal crystal ($Na_{3.05}Zr_2Si_{2.05}P_{0.95}O_{12}$) belonging to the space group R-3c, which is a sodium-ion conductive crystal, were confirmed. In addition, the obtained composite material as an electrode was observed with a TEM. As a result, a lattice image corresponding to a crystal structure was observed in all regions. Thus, no amorphous phase was confirmed.

A test battery was prepared by the same method as in Example 11. The obtained test battery was used to be subjected to a charge and discharge test by the same method as in Example 11, and a charge-discharge capacity and an average discharge voltage were measured. The results are shown in Table 2.

TABLE 1

| | (Mass %) | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Positive electrode active material | $Na_2FeP_2O_7$ | 60 | 60 | 60 | 60 | *60 | 60 | 60 | 60 | 76 | 81 | *60 | *60 | *60 |
| Sodium-ion conductive crystal | A ($Al_{10.32}Mg_{0.68}O_{16}$)($Na_{1.68}O$) | 35 | | | | 17.5 | | | | | | 35 | | |
| | B $Na_{2.6}Zr_2Si_{1.6}P_{1.4}O_{12}$ | | 35 | | | | 17.5 | | | | | | 35 | |
| | C $Na_{3.05}Zr_2Si_{2.05}P_{0.95}O_{12}$ | | | 35 | | | | | 17.5 | | | | | 35 |
| | D $Na_5YSi_4O_{12}$ | | | | 35 | 35 | 17.5 | 17.5 | 17.5 | | | | | |
| | E $Na_{1.7}Li_{0.3}Al_{10.7}O_{17}$ | | | | | | | | | 21 | 17 | | | |

TABLE 1-continued

| (Mass %) | | Example | | | | | | | | | | Comparative Example | | |
|---|---|---|---|---|---|---|---|---|---|---|---|---|---|---|
| | | 1 | 2 | 3 | 4 | 5 | 6 | 7 | 8 | 9 | 10 | 1 | 2 | 3 |
| Conductive agent | Acetylene black | 5 | 5 | 5 | 5 | 5 | 5 | 5 | 5 | 3 | 2 | 5 | 5 | 5 |
| | Amorphous phase | Present | Present | Present | Present | Present | Present | Present | Present | Present | Present | Absent | Absent | Absent |
| Charge-discharge capacity (mAh/g) | | 68 | 62 | 63 | 55 | 50 | 62 | 58 | 59 | 68 | 56 | Not charged | Not charged | Not charged |
| Voltage (V) | | 3 | 2.95 | 2.95 | 2.85 | 2.75 | 2.9 | 2.8 | 2.85 | 2.78 | 2.65 | | | |

*Fired in advance

TABLE 2

| (Mass %) | | Example | | | | | | | | Comparative Example | | |
|---|---|---|---|---|---|---|---|---|---|---|---|---|
| | | 11 | 12 | 13 | 14 | 15 | 16 | 17 | 18 | 4 | 5 | 6 |
| Negative electrode active material | $Na_2Ti_3O_7$ | 60 | 60 | 60 | 60 | *60 | 60 | 60 | 60 | *60 | *60 | *60 |
| Sodium-ion conductive crystal | A $(Al_{10.32}Mg_{0.48}O_{16})(Na_{1.86}O)$ | 35 | | | | | 17.5 | | | 35 | | |
| | B $Na_{2.6}Zr_2Si_{1.6}P_{1.4}O_{12}$ | | 35 | | | | 17.5 | | | | 35 | |
| | C $Na_{3.05}Zr_2Si_{2.05}P_{0.95}O_{12}$ | | | 35 | | | | 17.5 | | | | 35 |
| | D $Na_5YSi_4O_{12}$ | | | | 35 | 35 | 17.5 | 17.5 | 17.5 | | | |
| Conductive agent | Acetylene black | 5 | 5 | 5 | 5 | 5 | 5 | 5 | 5 | 5 | 5 | 5 |
| | Amorphous phase | Present | Present | Present | Present | Present | Present | Present | Present | Absent | Absent | Absent |
| Charge-discharge capacity (mAh/g) | | 65 | 60 | 62 | 53 | 50 | 59 | 55 | 58 | Not charged | Not charged | Not charged |
| Voltage (V) | | 0.5 | 0.7 | 0.6 | 0.9 | 1 | 0.7 | 0.8 | 0.7 | | | |

*Fired in advance

The test batteries of Examples 1 to 10 were able to be charged and discharged, and had a charge-discharge capacity of from 50 mAh/g to 68 mAh/g and a discharge voltage of from 2.65 V to 3.0 V. In contrast, the test batteries of Comparative Examples 1 to 3 were not able to be charged.

The test batteries of Examples 11 to 18 were able to be charged and discharged, and had a charge-discharge capacity of from 50 mAh/g to 65 mAh/g and a discharge voltage of from 0.5 V to 1.0 V. In contrast, the test batteries of Comparative Examples 4 to 6 were not able to be charged.

REFERENCE SIGNS LIST

1 . . . all-solid-state battery
2 . . . positive electrode
3 . . . sodium-ion conductive solid electrolyte
4 . . . negative electrode
5 . . . positive composite material as an electrode
6 . . . positive electrode current collector
7 . . . negative composite material as an electrode
8 . . . negative electrode current collector

The invention claimed is:

1. A composite material as an electrode for a sodium ion secondary battery, comprising:
    an active material crystal;
    a sodium-ion conductive crystal; and
    an amorphous phase formed at an interface between the active material crystal and the sodium-ion conductive crystal,
wherein the sodium-ion conductive crystal is selected from the group consisting of:
    a compound of the formula $Na_sA1_tA2_uO_v$, wherein A1 is at least one selected from the group consisting of Al, Y, Yb, Nd, Nb, Ti, Hf, and Zr, A2 is at least one selected from the group consisting of Si and P, s is from 1.4 to 5.2, t is from 1 to 2.9, u is from 2.8 to 4.1, and v is from 9 to 14; and
    beta-alumina.

2. The composite material as an electrode for a sodium ion secondary battery according to claim 1, wherein the active material crystal contains: Na; M, wherein M is at least one transition metal element selected from the group consisting of Cr, Fe, Mn, Co, and Ni; P; and O.

3. The composite material as an electrode for a sodium ion secondary battery according to claim 2, wherein the active material crystal comprises a triclinic crystal belonging to a space group P1 or P-1.

4. The composite material as an electrode for a sodium ion secondary battery according to claim 2, wherein the active material crystal comprises a crystal of the formula $Na_xM_yP_2O_7$, wherein x satisfies $1.20 \leq x \leq 2.80$ and y satisfies $0.95 \leq y \leq 1.60$.

5. The composite material as an electrode for a sodium ion secondary battery according to claim 1, wherein the active material crystal contains: at least one selected from the group consisting of Nb and Ti; and O.

6. The composite material as an electrode for a sodium ion secondary battery according to claim 5, wherein the active material crystal contains Na and/or Li.

7. The composite material as an electrode for a sodium ion secondary battery according to claim 5, wherein the active material crystal comprises an orthorhombic crystal, a hexagonal crystal, a cubic crystal, or a monoclinic crystal.

8. The composite material as an electrode for a sodium ion secondary battery according to claim 5, wherein the active material crystal comprises a monoclinic crystal belonging to a space group $P2_1/m$.

9. The composite material as an electrode for a sodium ion secondary battery according to claim 1, wherein the active material crystal comprises a crystal of at least one metal selected from the group consisting of Sn, Bi, and Sb.

10. The composite material as an electrode for a sodium ion secondary battery according to claim 1, wherein the sodium-ion conductive crystal contains: at least one selected from the group consisting of Al, Y, Zr, Si, and P; Na; and O.

11. The composite material as an electrode for a sodium ion secondary battery according to claim 10, wherein the sodium-ion conductive crystal comprises a monoclinic crystal, a hexagonal crystal, or a trigonal crystal.

12. The composite material as an electrode for a sodium ion secondary battery according to claim 1, wherein the amorphous phase contains: at least one selected from the group consisting of P, B, and Si; Na; and O.

13. An all-solid-state sodium battery comprising a positive electrode that is constituted by the composite material as an electrode for a sodium ion secondary battery of claim 1.

14. An all-solid-state sodium battery comprising a negative electrode that is constituted by the composite material as an electrode for a sodium ion secondary battery of claim 1.

15. A method of producing the composite material as an electrode for a sodium ion secondary battery of claim 1, the method comprising firing a raw powder material containing a crystallizable glass powder, to form the amorphous phase.

16. The method of producing the composite material as an electrode for a sodium ion secondary battery according to claim 15, wherein the crystallizable glass powder of the raw powder material comprises a precursor powder of the active material crystal and a powder of the sodium-ion conductive crystal.

17. The method of producing the composite material as an electrode for a sodium ion secondary battery according to claim 15, wherein the crystallizable glass powder of the raw powder material comprises a precursor powder of the sodium-ion conductive crystal and a powder of the active material crystal.

* * * * *